US010672257B2

(12) United States Patent
Blischke et al.

(10) Patent No.: US 10,672,257 B2
(45) Date of Patent: Jun. 2, 2020

(54) METHOD FOR SECURING FIRE-HAZARDOUS OPERATIONS TO BE EXECUTED BY A PERSON

(71) Applicants: Thyssenkrupp AG, Essen (DE); Thyssenkrupp Hohenlimburg GmbH, Hagen (DE)

(72) Inventors: Markus Blischke, Luedenscheid (DE); Markus Malms, Hemer (DE)

(73) Assignees: Thyssenkrupp AG, Essen (DE); Thyssenkrupp Hohenlimburg GmbH, Hagen (DE)

( * ) Notice: Subject to any disclaimer, the term of this patent is extended or adjusted under 35 U.S.C. 154(b) by 0 days.

(21) Appl. No.: 16/293,995

(22) Filed: Mar. 6, 2019

(65) Prior Publication Data

US 2019/0279492 A1    Sep. 12, 2019

(30) Foreign Application Priority Data

Mar. 8, 2018    (DE) .................. 10 2018 105 407

(51) Int. Cl.
*G08B 25/00* (2006.01)
*H04W 4/33* (2018.01)
(Continued)

(52) U.S. Cl.
CPC ........... *G08B 25/008* (2013.01); *G06Q 10/06* (2013.01); *G06Q 50/04* (2013.01); *G06Q 50/163* (2013.01); *G08B 17/10* (2013.01); *H04W 4/33* (2018.02)

(58) Field of Classification Search
CPC .... G08B 25/008; G08B 17/10; G06Q 50/163; G06Q 10/06; G06Q 50/04; H04W 4/33
(Continued)

(56) References Cited

U.S. PATENT DOCUMENTS 8,384,548 B2 *   2/2013   Knopf ............... E04G 21/32
                                                340/5.1
10,253,995 B1 *  4/2019   Grant ................ F24F 11/62
(Continued)

FOREIGN PATENT DOCUMENTS

GB        2488993 A        9/2012
WO    WO-2015/025012 A1    2/2015

OTHER PUBLICATIONS

Search Report for corresponding European Application No. 19161578.0 dated May 31, 2019.

*Primary Examiner* — Hirdepal Singh
(74) *Attorney, Agent, or Firm* — Harness, Dickey & Pierce, P.L.C.

(57) ABSTRACT

A method for securing fire-hazardous operations to be executed by a person in a fire-hazardous spatial work area, wherein a unique area identifier is associated with the work area and wherein the area identifier in the work area is electronically readable, includes receiving a unique identifier of the person, receiving an indication of the type of fire-hazardous operations to be executed, electronically reading the area identifier; sending a request to a database for master data on the work area, the request comprising the area identifier; receiving, in response to the sending of the request, the master data from the database, the master data including a unique spatial position of the work area; interrogating the safety devices of the work area to be deactivated for the duration of the time period; and sending a deactivation command to a fire alarm system.

15 Claims, 5 Drawing Sheets

(51) Int. Cl.
*G06Q 50/04* (2012.01)
*G08B 17/10* (2006.01)
*G06Q 10/06* (2012.01)
*G06Q 50/16* (2012.01)

(58) Field of Classification Search
USPC .......................................................... 340/577
See application file for complete search history.

(56) References Cited

U.S. PATENT DOCUMENTS

| | | |
|---|---|---|
| 2005/0260973 A1* | 11/2005 | van de Groenendaal .................. H04L 63/102 455/411 |
| 2010/0070097 A1 | 3/2010 | Morgenstern et al. |
| 2015/0096352 A1* | 4/2015 | Peterson ................... F24F 11/30 73/31.02 |
| 2016/0121151 A1* | 5/2016 | Schmitt ................... A62C 35/60 169/46 |
| 2016/0127875 A1* | 5/2016 | Zampini, II ...... H04W 52/0296 370/311 |
| 2016/0335731 A1* | 11/2016 | Hall ..................... G06Q 50/163 |
| 2018/0033275 A1* | 2/2018 | Ginsberg ............... G08B 17/10 |
| 2019/0066464 A1* | 2/2019 | Wedig .................. G06Q 90/205 |

* cited by examiner

Fig. 3a

| | |
|---|---|
| Workplace (location) | Beize > |
| Authorization time interval | |
| Date | 10.12.2017 > |
| Start time | 13:40 > |
| End Time | 13:40 > |
| Department in charge | T-S2 (Locksmith's shop Beize) |
| Budget responsible officer/ facility manager | |
| Name | Foreman > |
| Telephone | 3446 > |
| Contracting company / department | T-S2 (Locksmith's shop Beize) |
| Job to be done | 2 / 4 selected > |
| Job description | Cylinder protection defective> |

Fig. 3b

| | |
|---|---|
| Yes | . . . . . |
| Yes | Prepare a fire extinguisher in a work room area |
| Emergency plan, operational alarm plans, emergency numbers, first aid | Yes \| No |
| ☐ | Connect fire hose and lay it out |
| ☐ | Delimit and mark the work area |
| ☐ | Cover pipelines, apparatus, etc. |
| ☐ | Remove flammable gases, vapors, dust deposits |
| ☐ | Check pipelines, apparatus, etc. for leaks |
| ☐ | Cover grates / pipe feed-throughs /air shafts/ manholes |
| ☐ | . . . . . |
| ☐ | . . . . . |

METHOD FOR SECURING FIRE-HAZARDOUS OPERATIONS TO BE EXECUTED BY A PERSON

CROSS-REFERENCE TO RELATED APPLICATIONS

The present application hereby claims priority under 35 U.S.C. § 119 to German patent applications numbers DE 102018105407.6 filed Mar. 8, 2018, the entire contents of each of which are hereby incorporated herein by reference.

The invention relates to a method for securing fire-hazardous operations to be executed by a person, a safety device for securing fire-hazardous operations to be executed by a person, and a system comprising the safety device.

If, for example, a fire-hazardous operation, such as grinding, cutting, burning and welding, has to be executed on a company site, it must be ensured that no fire events can occur as a result thereof. In addition, there must also be no danger to the person executing the fire-hazardous operations, for example as a result of gas explosions or the like. Ultimately, it is a matter of preventing fire events, the risk of which should be minimized. Fire alarm systems exist which also originate from the field of preventive fire protection. However, such systems receive events from fire detectors regarding fires that have already occurred, so that their risk of occurrence cannot be minimized.

The invention has as its object to provide for a method for a method for securing fire-hazardous operations to be executed by a person, a corresponding computer program product, a related safety device, and a corresponding system comprising the safety device and the fire alarm system.

The object is achieved by the features of the independent patent claims. Preferred embodiments of the invention are given in the dependent claims.

A method for securing fire-hazardous operations to be executed by a person in a fire-hazardous spatial work area is presented, wherein a unique area identifier is associated with the work area, wherein the area identifier in the work area is electronically readable, the method comprising a safety device:
  receiving a unique identifier of the person,
  receiving an indication of the type of fire-hazardous operations to be executed,
  electronically reading the area identifier,
  sending a request to a database for master data on the work area, the request comprising the area identifier,
  receiving, in response to the sending of the request, the master data from the database, the master data comprising a unique spatial position of the work area,
  receiving a time period of execution of the fire-hazardous operations,
  interrogating the safety devices of the work area to be deactivated for the duration of the time period, wherein the safety devices comprise fire detectors,
  sending a deactivation command to a fire alarm system, the deactivation command controlling the fire alarm system to exclude events reported by the safety devices to be deactivated for the time period for the immediate assessment of a fire alarm,
  sending safety data to a fire brigade database of a fire brigade responsible for the work area, the safety data comprising the type of fire-hazardous operations to be executed, the time period, the spatial position of the work area and the safety devices to be deactivated,
  authorizing, after the sending of the safety data, the execution of the fire-hazardous operations by the person for the time period.

The embodiments of the invention could have the advantage that unintentional deactivation of fire prevention safety devices, such as fire detectors, can be reliably avoided. For example, the deactivated safety devices located in the work area are indicated via a user interface on the safety device and the safety device then asks which of these safety devices are to be deactivated. Since this is done on the basis of the clear spatial position of the work area, which is defined via the master data on the basis of the electronically read area identifier, it is ensured that safety devices having nothing at all to do with the work area and thus with the fire-hazardous operations to be executed are not accidentally instructed to be deactivated. Thus the scenario is avoided in which, for example due to carelessness a fire detector located outside the work area is deactivated and a fire then accidentally develops at the location of the deactivated fire detector. A fire alarm system would ignore such a reported fire event, as it cannot detect it at all due to complete deactivation of the local safety device.

It should be noted that, in addition to fire detectors, the safety devices can also include any other technical equipment that can be used to detect an event resulting from or leading to a fire. These include smoke detectors, CO detectors, and flammable gas detectors. For example, safety devices also include sprinkler heads of sprinkler systems which are sealed with a glass ampoule, whereby the glass ampoule melts when heat is generated and water can then escape from the sprinkler pipe network. This leads to a drop in pressure which can be detected and thus attributed to a fire. This can also be set up in such a way that the local position of the sprinkler head causing the pressure drop can be easily determined.

The fact that the safety data are now additionally transmitted to a fire brigade database of the fire brigade responsible for the work area could ensure that the firefighting units responsible for the work area are provided with the necessary data at all times in a form free of media/environment discontinuity and thus in error-free form, as a result thereof the fire brigade can on the one hand decide on the necessity of an operation and on the other hand use appropriate firefighting measures in a targeted manner.

According to an embodiment of the invention, the method comprises executing the fire-hazardous operations by the person in the time period.

According to an embodiment of the invention, the master data comprises further indications of any hazardous substances and/or machinery present in the work area during the time period which could endanger the person during the execution of the fire-hazardous operations. For instance, these further indications can be displayed by a safety device of a person.

This could have the advantage that the person would be in a more target-oriented position to decide which of the safety devices to deactivate and which not. For example, do the safety devices include gas detectors, i.e. detectors that report the leakage of gas? For example, when working in a work area where combustible gas pipes are installed, the person could decide that an associated gas detector should not be deactivated because deactivated detection of leaking gas could lead to an explosion when executing fire-hazardous operations such as welding. If, on the other hand, the worker executes welding operations using, for example, ethylene welding gas in the vicinity of such gas detectors and knows that gas pipes running in the vicinity of the work area are currently free of gas, he will decide to deactivate such a gas detector, as otherwise an unwanted false alarm could occur due to the ethylene gas used.

According to an embodiment of the invention, the method further comprises sequentially querying by the safety device various safety measures to be carried out by the person before the execution of the fire-hazardous operations, wherein the safety measures are capable of minimizing the risk of fire development or personal injury caused by the fire-hazardous operations. In principle, this is independent of whether the master data contains the further information regarding the hazardous substances and/or machines. However, it could be advantageous if the person is shown these additional details on the safety device in order to decide which of the safety measures are to be marked as to be executed.

If, for example, a combustible gas pipeline runs near the point where the fire-hazardous work is to be executed, the person could be informed of this via the further indications and, furthermore, as a safety measure, the person could be asked whether an inspection of the pipelines and associated equipment for leaks should be carried out before the fire-hazardous operation is executed. Another type of a safety measure is, for example, the covering of pipelines or apparatus or of containers which could cause a fire, for example in the event of flying sparks.

An example of machines which could endanger the person when executing the fire hazardous operations are machines which generate large amounts of chips or dust, since the risk of fire or even explosion is significantly increased when chips, especially metal chips or dust in general, come into contact with hot surfaces or sparks.

Another example of various safety measures is the provision of a fire extinguisher in the work area or even the connection and installation of a fire hose in the work area. This makes particular sense if fire detectors located in the work area are deactivated and as a result the operating time until the arrival of a fire-fighting unit in the event of a fire is significantly increased, since a corresponding fire event as such cannot be registered immediately due to the deactivated fire detectors.

According to an embodiment of the invention, the authoring only comes into effect when all safety measures have been fully queried. This could prevent the person's carelessness from overlooking essential safety measures and thus exposing him or herself to danger, even risking the general risk of a fire due to the fire-hazardous operations.

According to an embodiment of the invention, the method further comprises analysis of the type of fire-hazardous operations to be executed, and/or hazardous substances and/or machinery present in the work area during the time period, wherein the method further comprises automatic selection of the safety measures to be queried from a safety measures catalog based on the analysis. This could have the advantage that the person does not have to be confronted with a comprehensive catalogue of safety measures in its entirety, from which the person then has to painstakingly select suitable safety measures, but a pre-selection and thus restriction of the safety measures to be queried takes place, so that the person is then in a position to select the most suitable safety measures from a much smaller set of safety measures compared to the entire catalogue of safety measures. A smaller set of safety measures in comparison with all safety measures contained in the safety measures catalog would thus ensure that the probability of an incorrect entry when the person queries the safety measures to be executed is minimized. Physiologically it will be in such a way that with given concentration ability with a small set of inquiries of safety measures which can be worked off the probability of error concerning the selection of relevant safety measures is significantly lower compared to a large set of queried safety measures.

For example, this automatic selection of the security measures to be queried could be carried out by an evaluation module, whereby this evaluation module is either integrated in the safety device itself or located outside the safety device.

In the latter case, the safety device has, for example, an air interface (WLAN, radio, Bluetooth, mobile radio) via which the type of fire-hazardous work to be performed and/or the hazardous substances and/or machines present in the work area during the time period are transmitted to this external evaluation module.

According to an embodiment of the invention, the method further comprises:
receiving from the person an entry of a confirmation of a set of queried safety measures, the confirmation indicating that the set of safety measures is to be executed, verification whether the confirmed safety measures related to the further indications of hazardous substances and/or machinery present in the work area are sufficient to minimize the risk of fire development or personal injury from the operations in the work area, wherein the authoring only comes into effect when the verification shows that the confirmed safety measures are sufficient.

This could have the advantage that the danger which results from the execution of the fire-hazardous work can be further minimized, since on one hand the person can freely combine the safety measures available to him and on the other hand it is checked electronically whether the combination is sufficient or whether the person has not overlooked an essential safety measure. This check can also be carried out by the evaluation module or by the safety device itself. For example, a combination of the safety measures "Provide fire extinguisher" and "Install and connect fire hose" could be evaluated as insufficient if, on the other hand, "Check pipelines for leaks" was not selected and work is carried out near combustible gas-carrying pipelines. Permissibility could, however, be given with the combination "Provide fire extinguisher" and "Check pipelines for leaks". Permissibility could also be given for "Install and connect fire hose" and "Check pipelines for leaks".

According to an embodiment of the invention, the method further comprises sending a control command to those technical systems from which there is a risk of fire development or personal injury caused by the executing of the fire-hazardous operations, wherein the control command controls the technical systems such that during the period the risk of fire development or personal injury caused by the executing of the fire-hazardous operations is minimized.

In the above example of dust-generating machines, it could thus be ensured that, irrespective of an intended manual deactivation of the machine during the time period, the machine is put out of operation in a fully automatic manner by the control command, so that human error is ruled out and possible fire development is prevented in a targeted manner. Another example is the flammable gas pipeline described above, which can also be generally regarded as a "technical system". If fire-hazardous operations are now executed in the immediate vicinity of this gas line or even on the gas line itself, the closing of corresponding valves in the gas line due to the control command could prevent an explosion hazard due to a flammable gas being conducted at the time the fire-hazardous operations are executed.

According to an embodiment of the invention, the authoring only comes into effect when the technical system has acknowledged receipt and proper processing of the control command. This could be a further level of safety, since it is not automatically assumed that sending the control command in itself deactivates the technical systems. Rather, the technical system itself must have acknowledged the proper receipt and processing of the control command before it is authorized to carry out the fire hazardous operations.

According to an embodiment of the invention, the method further comprises, the fire alarm system receiving, within the time period, a first event indication related to a possible fire from a fire detector positioned in an area adjacent to the work area into which any smoke may overflow from the work area, wherein the fire alarm system, based on the first event indication,

- immediately triggers a fire alarm with a lower priority in comparison to a normal fire alarm; and/or
- triggers a fire alarm with a lower priority in comparison to a normal fire alarm when a second event indication related to a possible fire has been received beforehand within the time period by a fire detector positioned in the work area; and/or
- triggers a fire alarm with normal priority when no second event indication related to a possible fire has been received beforehand within the time period from a fire detector in the working area.

This could have the advantage that, despite the deactivation of any fire detectors in the work area, any fire events can still be reliably detected or reacted to in an appropriate manner. The "normal" scenario would be that any event reported by an active fire detector would be interpreted as a fire alarm. However, since smoke can now overflow from the work area in which the fire-hazardous operations are carried out into the area adjacent to the work area, it is highly probable that a corresponding "fire event", which is reported by such a fire detector located in an area adjacent to the work area, only results from the fact that smoke resulting from the fire-hazardous operations from the work area has moved over into the adjacent area. It is therefore assumed that this is not a fire, but that the corresponding smoke development is only directly attributable to the fire-hazardous operations. This is because grinding, cutting, burning and welding in particular often cause smoke as a result of these operations, but this has nothing to do with a fire in the conventional sense.

By considering the low-priority fire alarm the report of a possible fire is taken into account, so that the low-priority fire alarm is not completely ignored. On the other hand, it prevents the fire brigade from being deployed on a large scale, which is highly likely to be unnecessary.

This can be refined by assuming, as a further criterion for triggering the low-priority fire alarm, that, within the time period in which the fire-hazardous operations are being carried out, smoke has already been detected by a fire detector which may have been deactivated there. In this context, deactivated only means that events reported by this fire detector do not lead directly to an alarm, but are initially only assigned to the fire-hazardous operations. The fire detector itself is still electronically active and able to report corresponding events.

By correlating the reporting event of the fire detector located in the work area with the reporting event of the fire detector located in the area adjacent to the work area, the probability of the correctness of the interpretation of the reporting of the first event is significantly increased, as this is automatically attributed to the fact that smoke first arose in the area in which the fire-hazardous operations were executed and that this smoke then moved over to the adjacent area.

The opposite, i.e. that smoke was only detected in the adjacent area and no smoke was detected in the actual work area, automatically results in an alarm being issued with normal priority, as this means that the smoke in the adjacent area is most probably not due to the fire-hazardous operations themselves (i.e. the smoke, if any, produced by the fire-hazardous operations themselves).

According to an embodiment of the invention, in the event of the fire alarm with lower priority in relation to which the second event indication related to a possible fire was received beforehand within the time period from a fire detector positioned in the work area, an information related to the second event indication in conjunction with the indication of a possible correlation between these two events and the safety data are output on an operation control computer of the fire brigade responsible for the work area in addition to the information related to the first event indication.

This could have the advantage that, on one hand, the fire brigade is informed about the alarm at all in order to make appropriate decisions on how to deal with it. Since the possible correlation between the two events and the safety data are now also displayed, the fire brigade's operations manager has a complete picture of the extent to which this low-priority alarm should lead to a complete fire brigade deployment, or whether it is sufficient to send a smaller task force or even a single person to the adjacent area in question for control purposes. If, for example, the safety data indicate that the type of fire-hazardous operations to be executed only involves the production of a soldered connection on a single small cable, it can be assumed that a soldering process itself will result in so little smoke that a smoke detector located in the work area will not detect this smoke at all. This would enable the fire brigade to conclude that in all probability the smoke development in the adjacent area is not due to the soldering work, so that a normal fire brigade operation would be arranged.

If the safety data now contains additional information on the person himself who carries out the fire hazard work, this could be used to carry out appropriate rescue measures for the person: A telephone number associated with the person, which is included in the safety data, could be used to call the person directly to check whether a fire has occurred or not. Personal health data stored in the safety data, such as pre-diabetic or pre-existing conditions in general, could be used to instruct an appropriate rescue team in advance to take this condition into account during the rescue operation and thus contribute to improved personal rescue.

In another aspect the invention relates to a computer program product having instructions executable by one or more processors to perform the method described above. In a further aspect the invention relates to a safety device for securing fire-hazardous operations to be executed by a person in a fire-hazardous spatial work area, wherein a unique area identifier is associated with the work area, wherein the area identifier in the work area is electronically readable, wherein the safety device comprises a processor and a memory, wherein the memory comprises processor executable instructions, wherein the execution of the instructions by the processor causes the safety device to:

receive a unique identifier of the person, receive an indication of the type of fire-hazardous operations to be executed, electronically read the area identifier, send a request to a database for master data on the work area, the request comprising the area identifier, receive, in response to the sending of the request, the master data from the database, the master data comprising a unique spatial position of the work area, receive a time period of execution of the fire-hazardous operations, interrogate the safety devices of the work area to be deactivated for the duration of the time period, wherein the safety devices comprise fire detectors, send a deactivation command to a fire alarm system, the deactivation command controlling the fire alarm system to exclude events reported by the safety devices to be deactivated for the time period for the immediate assessment of a fire alarm, send safety data to a fire brigade database of a fire brigade responsible for the work area, the safety data comprising the type of fire-hazardous operations to be executed, the time period, the spatial position of the work area and the safety devices to be deactivated, authorize, after the sending of the safety data, the execution of the fire-hazardous operations by the person for the time period.

In a further aspect the invention relates to a system, comprising the described, a fire alarm system, and an optional operation control computer, which is described above as well.

It should be noted that the embodiments and examples described above can be combined in any way as long as these combinations are not mutually exclusive.

In the following, the preferred embodiments of the invention are explained in more detail using the drawings, wherein:

FIGS. 3a and 3b are examples of content that can be displayed on the safety device;

Figure 4:
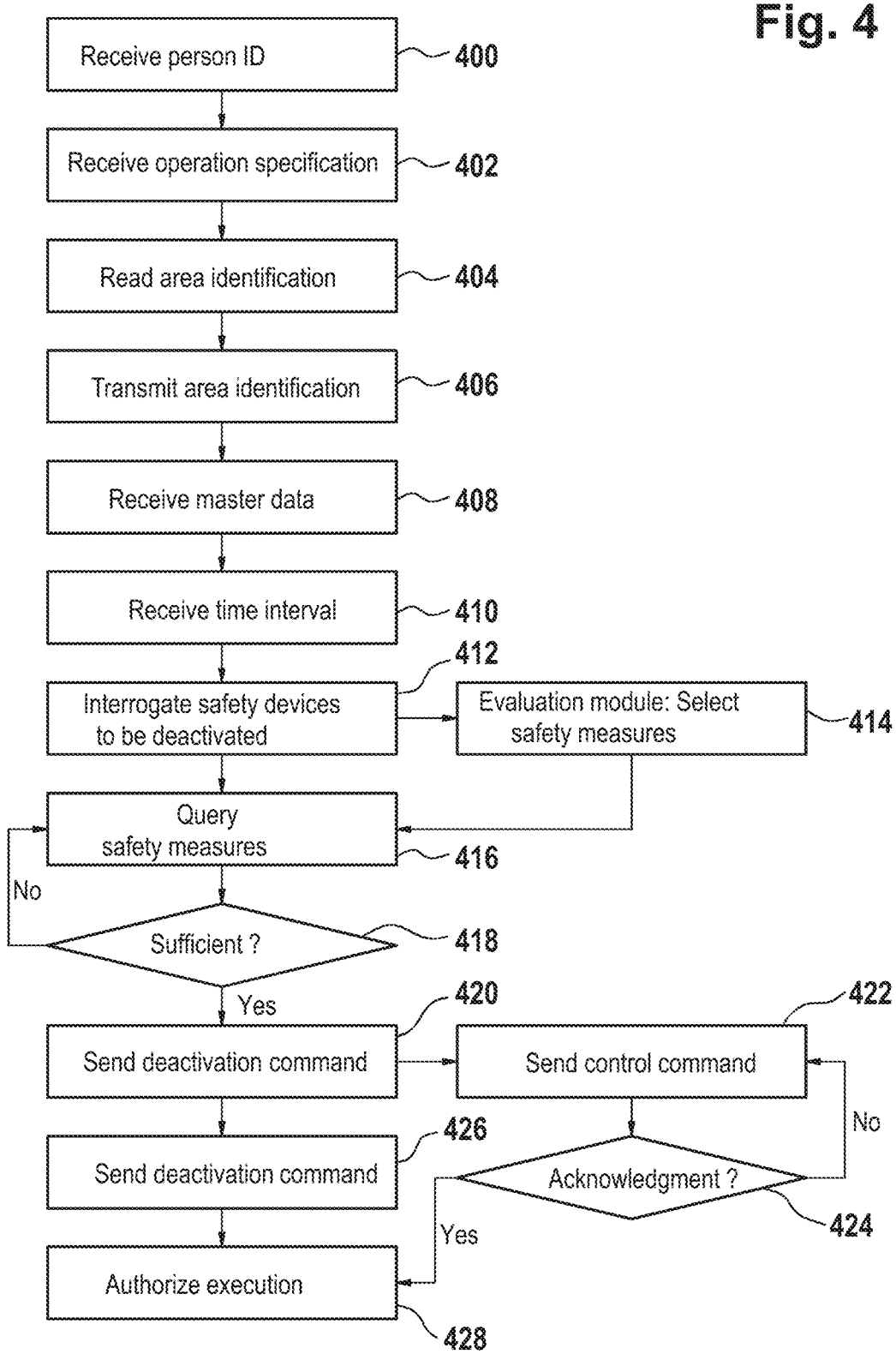
Figure 5:
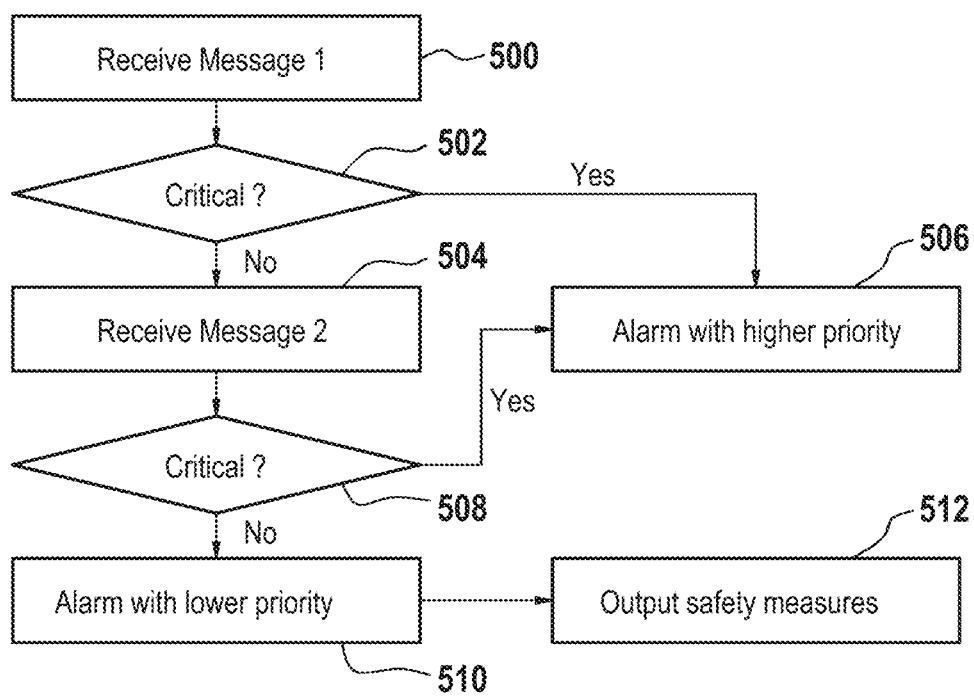

FIG. 4 a flowchart for securing fire hazardous operations to be performed by a person in a fire-hazardous work area; and FIG. 5 is a flow chart of a fire alarm assessment method initiated in the context of securing the fire-hazardous operations to be executed.

In the following, similar elements are marked with the same reference numbers.

Figure 1:
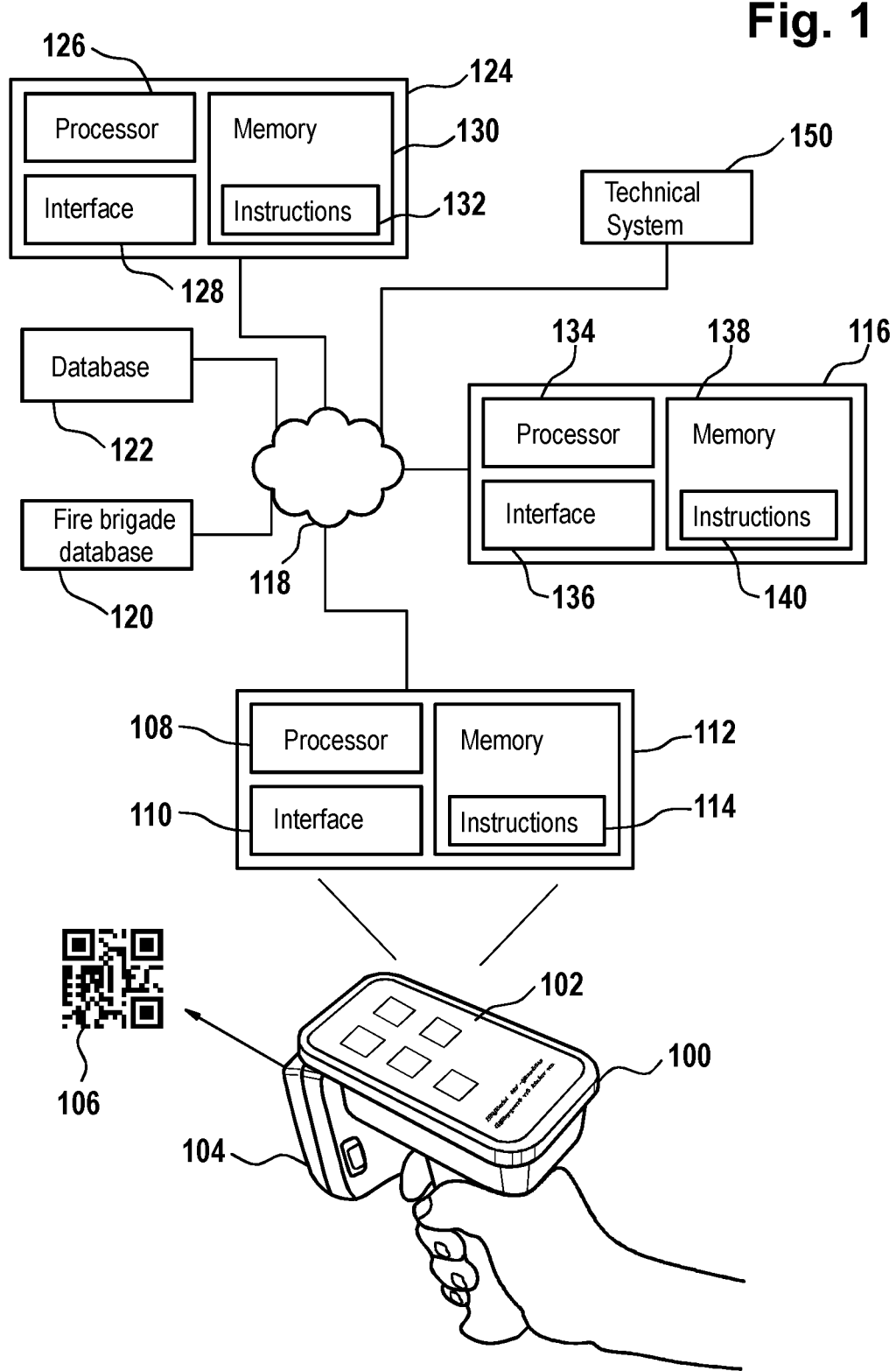
FIG. 1 is block diagram of a system comprising a safety device, a fire alarm system, a fire brigade database and a operations control computer.

FIG. 1 shows initially a safety device, wherein in the example of FIG. 1 the safety device has the shape of a hand scanner 100. The hand-held scanner 100 has a reader 104, which can be used to optically read a QR code 106. The QR code encodes a spatial position of a work area and is located, for example, at the entrance to a specific work area that can be clearly defined, or at a machine if the machine itself is declared as a work area. The QR-Code 106 can be scanned using the hand-held scanner 100. The safety device 100 also has a display 102, for example a display, which the person operating the safety device can use to receive and enter information.

An area identifier is thus encoded in QR code 106, wherein the scanner 100, after reading the area identifier, can send it to a database 122 via a network 118 such as an intranet or the Internet. In response to this, the scanner 100 receives a specification of master data, whereby the master data comprises a unique spatial position of the work area to which the QR code 106 and thus the area ID is assigned.

Using the display 102, the person's hand-held scanner can now list various safety devices such as fire detectors, which the person wishes to deactivate before carrying out the fire-hazardous operations. After receiving a corresponding input on the display 102, a corresponding deactivation command of the selected fire detector to be deactivated is transmitted from the scanner 100 to a fire alarm system 124, wherein the deactivation command controls the fire alarm system 124 in such a way as to exclude any alarm events reported by the fire detector for the immediate evaluation of a fire alarm for the time period in which the fire-hazardous operations are to be carried out. "Immediate" means that the fire alarm system immediately triggers a fire alarm with normal priority if a fire event is generated by the deactivated fire detector.

Preferably, the list of possible deactivatable safety devices is shown on display 102 in a restricted manner so that only those safety devices are listed which are assigned to the spatial working area which is at risk of fire. For example, the master data received from database 122 may also contain a list of the safety devices that are assigned to the area identifier.

As already described above, this could prevent a person from unintentionally deactivating a safety device which is unrelated to the fire-hazardous operations to be executed in the fire-hazardous work area.

For a better understanding, FIG. 1 is explained below together with the flowchart of FIG. 4.

As already mentioned, the procedure begins at step 400 with the receipt of a person's identifier, wherein this can also be implemented via the display, for example a touch screen or a keyboard arranged on the display or a reading device integrated in the scanner for reading a person's identifier. For example, the hand-held scanner 100 may have an RFID scanner, wherein the read identifier can be transmitted to the reader 100 via an RFID tag, and the RFID tag is owned by the person who is performing fire-hazardous operations.

In step 402, an additional indication of the type of fire-hazardous operations to be executed is received, e.g. whether grinding, cutting, burning or welding or similar operations are to be executed. This can be supplemented with information on the specific activity to be carried out (e.g. welding pipe 157 at branch T3).

In step 404, the area identifier 106 is optically read using the handheld scanner 100 and its reading device 104. However, general electronic reading is also possible, including reading using RFID technologies or general wireless technology such as Bluetooth or WLAN technology. After the QR code 106 in the example of FIG. 1 has been optically read by the reading device 104, the read area identifier is then transmitted to the database 122 in step 406. The database 122 stores an assignment of area identifiers to unique spatial positions of work areas. The database may also store other information, such as hazardous substances in the work area or machinery, which could endanger the person performing the fire-hazardous operations. At least the clear spatial position of the working area, optionally also the other data contained in the database regarding hazardous substances etc., can then be transferred back from the database 122 to the scanner 100 in step 408.

In step 410, a further input is made at the scanner regarding the time period within which the fire-hazardous operations are planned to be executed.

In step 412, the safety devices to be deactivated are interrogated by the scanner 100, wherein after the person has entered the safety devices to be deactivated into the scanner, in step 420, a deactivation command is sent to a fire alarm system via the network 118, wherein this deactivation command controls the fire alarm system 124 to exclude events reported by the safety devices to be deactivated for the time period received in step 410 for immediate evaluation of a fire alarm.

In step 426, the safety data is then sent from the scanner 100 to a firefighting database 120 via the network 118, the safety data comprising at least the type of fire-hazardous operations to be performed, the time period, the spatial position of the work area, and the safety devices to be deactivated.

The procedure finally ends in step 428 with the authorization of the execution by the scanner 100.

FIG. 3a shows an example of the data available to the scanner 100 as part of the safety data. Here first an exact location is indicated, in the present case a pickling solution, wherein this location should be specified so far that a clear allocation of the location is possible to the work area, in which the fire-hazardous operations are to be accomplished. It also indicates the time period during which the operations are to be carried out and an indication of the person or department or company carrying out the operations. Not shown here is the unique identification of the person performing the operations. However, as already mentioned above, this is also the subject of the information available to the Scanner 100, which is preferably also transmitted to the firefighter database in the safety data.

The additional indication of the persons responsible for the system, which is located in the work area in which the fire-hazardous work is to be carried out (for example room 210), helps to query responsibilities in a simple manner in the event of an alarm, in order to then contact the responsible person, for example via the telephone number given, and to query whether a false alarm or an actual fire has occurred.

FIG. 3a also shows the type of fire-hazardous operations to be carried out "operations to be carried out, description of operations".

Steps 414 to 418 and 422 to 426, which are optional, have not yet been discussed.

As shown in FIG. 1, the scanner 100 includes a processor 108 and a memory 112 with instructions 114. Instructions 114 can be used by processor 108 to control the scanner 100 to perform the described process steps when executed by processor 108. Communication via the 118 network is possible via the scanner interface 100.

The same applies analogously to the fire alarm system, which also has a processor 126 and a memory 130 containing instructions 132. The execution of instructions 132 by processor 136 controls the fire alarm system to perform any method steps discussed in the present description regarding the fire alarm system. The fire alarm system is able to communicate via the network 118 via interface 128.

An operation control computer 116 of the fire brigade is shown in FIG. 1 as well. The operation control computer is responsible for the area in which the fire-hazardous operations are to be carried out. Like the central fire alarm system and the scanner 100, this operation control computer also has a processor 134, a memory 138 containing instructions 140, wherein the execution of instructions 140 by the processor 134 controls the operation control computer for performing those method steps which are discussed in the present description. The interface 136 of the operation control computer 116 is used to enable communication via the network 118.

In order to further prevent a possible hazard to the person while executing the fire-hazardous operations without minimizing the risk in this respect, it is planned that after interrogating the safety devices to be deactivated in step 412, a query will be made on the display 102 in such a way as to determine whether and which safety measures the person intends to initiate to secure the fire-hazardous operations. This corresponds to step 416 in FIG. 4. A corresponding interface, which could be shown on display 102, is shown in FIG. 3b. For example, a systematic sequence of questions could be asked as to whether the person considers it necessary to provide a fire extinguisher at the workplace, whether he considers the matter to be so critical that an emergency response plan and operational alert plans are available, that a fire hose must be connected and laid out, etc. The user or person is thus systematically guided through a set of requested safety measures, so that nothing is forgotten that might be necessary for his safety.

As already mentioned above, it is possible that the master data may contain further information concerning hazardous substances and/or machinery present in the work area during the time period which could endanger the person performing the fire-hazardous operations. This additional information from the master data can now be used by an evaluation module in step 414 to display those safety measures from a catalogue of safety measures on the display 102 which are particularly relevant for the current hazardous area and the operations to be performed. This evaluation module can either be integrated in the scanner 100 or be integrated in a system that is located outside the scanner, for example the database 122.

The safety measures selected by the evaluation module are then those queried in step 416, where the user must comment on each selected safety measure and indicate whether he considers it necessary or not.

In the optional step 418, an assessment is then made as to whether the safety measures selected by the user are sufficient to ensure the safety of the user when carrying out the fire-hazardous operations. The evaluation module can also perform this evaluation in step 418.

It should be noted that step 414 is marked as performed by the evaluation module only as an example in FIG. 4. This can also be done by another module which is contained in the database 122 or even in the scanner 100.

If step 418 shows that the security measures selected by the user are not sufficient, the procedure returns to step 416, in which the user is again requested to deal with the security measures and select suitable security measures here. If, on the other hand, step 418 shows that the security measures are sufficient, the procedure in step 420 continues as described above by sending the deactivation command.

The optional step 422, which can be provided by the scanner 100 after the deactivation command has been sent or after the safety data has been sent via the network 118, is used to control technical devices from which there is a risk of fire or personal injury caused by the work being performed during the execution of the operations. The aim is that these technical devices are automatically controlled via the control command in such a way that the danger of fire development or the danger to persons themselves caused by the work is minimized during the time period. The corresponding information required for this with regard to these technical systems can, for example, be contained in the master data.

Once the control command has been transmitted in step 422, the technical device can then acknowledge receipt and proper processing of the control command in step 424. This can be checked by the scanner 100, wherein, for example, if an acknowledgement has not been received within a predetermined period of time, the control command is resent. Only when a proper acknowledgement has actually been made by the technical system, the authorization to carry out the fire-hazardous operations is given in step 428.

The technical system is marked in FIG. 1 with reference sign 150.

Figure 2:
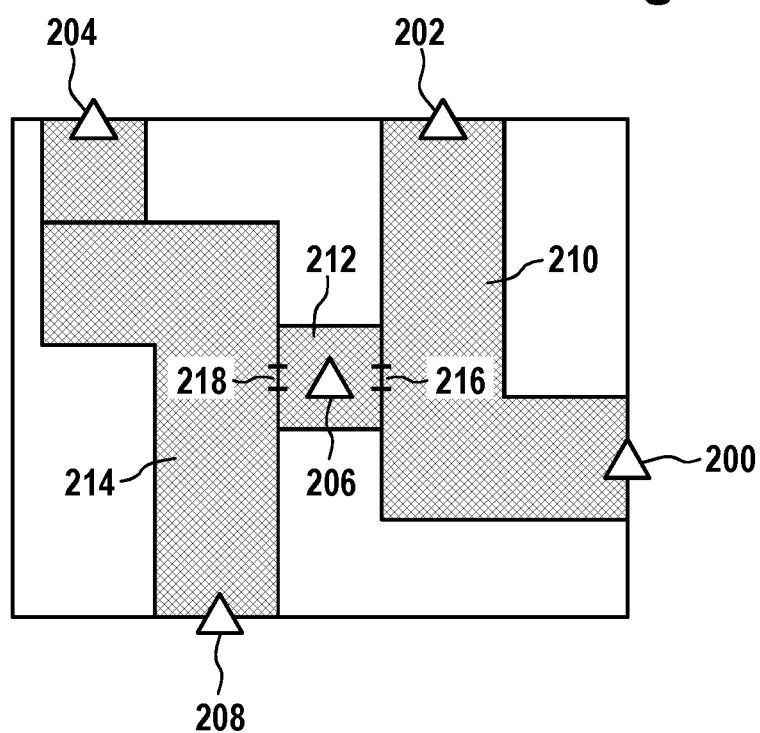
FIG. 2 is a schematic view of an overview of different room areas equipped with fire detectors.

FIG. 5 shows a flow chart of a method which can be carried out by the fire alarm system 124. The starting point is an arrangement of fire detectors and areas as shown in FIG. 2. FIG. 2 shows different room areas 210, 212 and 214, which are connected by doors 216 and 218 respectively. Fire detectors are assigned to each room area, wherein room area 210 has two fire detectors 200 and 202, room area 212 has one fire detector 206, and room area 214 has two fire detectors 204 and 208.

According to the flowchart in FIG. 5, the fire detection system receives a first message in step 500 from one of the fire detectors 200 or 202, but since it is assumed below that the two fire detectors were marked in step 412 as safety devices to be disabled, in step 502 the fire detection system assesses this fire event message from the fire detectors 200 and 202 as non-critical (step 502). If, on the other hand, the two fire detectors 200 and 202 had not been marked as to be deactivated, this would have immediately led to an alarm with high (=normal) priority in step 506.

The method continues in step 504 with the receipt of a second message, this time from fire detector 206. Since the fire detectors 200, 202 and 206, which have output message 1 and message 2 respectively, are located in different room areas, but which are connected to each other in such a way that any smoke can overflow from work room area 210 into the immediately adjacent room area 212, the fire alarm system in step 508 will not initially consider the smoke development message received in step 504 from the fire detector 206 to be critical either, since the fire alarm system assumes that, in the course of the welding operation carried out in area 210, for example, self-generated smoke has moved through door 216 into room 212. This would have been different if no message 1 had been received from one of the smoke detectors 200 or 202 in step 500, so that in this case step 508 would have immediately triggered a high priority alarm (step 506).

However, since this is not the case, a low priority alarm is triggered in step 510, i.e. with a priority lower than the normal alarm priority given in the event of a fire.

In the event of this fire alarm with low priority in step 510, the fire brigade responsible for the work area (room) 210 also outputs the safety data in step 512 on the operation control computer 116 in addition to the information regarding the two messages, which were previously transmitted to the fire brigade database 120 in step 426. The complete information regarding the safety data and the two messages will then finally enable the fire brigade operations manager to decide whether any fire-fighting measures need to be initiated at all or which measures are considered important and correct in the present scenario.

The skilled person will understand that aspects of the present invention may be executed as a device, process or computer program product. Accordingly, aspects of the present invention may take the form of a pure hardware design, a pure software design (including firmware, memory software, micro-code, etc.), or a design combining software and hardware aspects, all of which may be commonly referred to herein as a "circuit", "module" or "system". Furthermore, aspects of the present invention may take the form of a computer program product embodied in a computer-readable medium or in multiple computer-readable media in the form of computer-executable code.

Any combination of one or more computer-readable media(s) may be used. The computer-readable medium may be a computer-readable signal medium or a computer-readable storage medium. A "computer-readable storage medium" as used herein encompasses a physical storage medium capable of storing instructions executable by a processor of a computer device. The computer-readable storage medium may be referred to as a computer-readable non-volatile storage medium. The computer-readable storage medium may also be described as a tangible computer-readable medium. In some embodiments, a computer-readable storage medium may also be capable of storing data that enables it to be accessed by the processor of the computer device. Examples of computer-readable storage media include, but are not limited to: a floppy disk, a magnetic hard disk, a solid-state hard disk, flash memory, a USB flash drive, random access memory (RAM), read-only memory (ROM), an optical disk, a magneto-optical disk, and the register file of the processor. Examples of optical disks include Compact Disks (CD) and Digital Versatile Disks (DVD), such as CD-ROM, CD-RW, CD-R, DVD-ROM, DVD-RW, or DVD-R disks. The term computer-readable storage medium also refers to various types of recording media that are capable of being accessed by the computer device via a network or communication link. For example, data can be retrieved via a modem, the Internet, or a local network. Computer executable code stored on a computer-readable medium may be transmitted over any suitable medium, including, but not limited to, wireless, wired, optical, RF, etc., or any suitable combination of the aforesaid media.

A computer-readable signal medium may contain a propagated data signal containing the computer-readable program code, for example, in a base signal (baseband) or as part of a carrier signal (carrier wave). Such a propagation signal may be in any form, including, but not limited to, an electromagnetic form, an optical form or any suitable combination thereof. A computer-readable signal medium may be any computer-readable medium which is not a computer-readable storage medium and which is capable of transmitting, distributing or transporting a program for use by or in connection with a system, apparatus or device for executing instructions.

"Computer memory" or "memory" is an example of a computer-readable storage medium. A computer memory is any memory that is directly accessible to a processor.

"Computer data memory" or "data memory" is another example of a computer-readable storage medium. Computer data memory is any non-volatile computer-readable storage medium. In some forms, a computer memory may also be a computer data memory, or vice versa.

"Processor" as used herein encompasses an electronic component capable of executing a program- or machine-executable instruction or computer-executable code. A reference to the computer device that includes a "processor" should be interpreted to mean that it may include more than one processor or processing cores. For example, the processor may be a multi-core processor. The term computer device or computer can also be interpreted as referring to a cluster or network of computer devices or computers each comprising a processor or processors. The computer executable code may be executed by multiple processors that may be distributed within the same computer device or even across multiple computers.

Computer executable code may include machine executable instructions or a program that causes a processor to perform an aspect of the present invention. Computer-executable code for performing operations for aspects of the present invention may be written in any combination of one or more programming languages, including an object-oriented programming language such as Java, Smalltalk, C++ or similar, and traditional procedural programming languages such as the programming language "C" or similar, and translated into machine-executable instructions. In some cases, the computer-executable code may be in the form of a high-level programming language or in a pre-translated form, and may be used in conjunction with an interpreter that generates the machine-executable statements.

The computer-executable code may be executed entirely on a user's computer, partly on the user's computer, as a stand-alone software package, partly on the user's computer and partly on a remote computer, or entirely on the remote computer or server. In the latter case, the remote computer may be connected to the User's computer through any type of network, including a local area network (LAN) or wide area network (WAN), or the connection may be established with an external computer (for example, over the Internet using an Internet service provider).

The computer executable code can be executed across multiple processors, for example, across multiple processors distributed in a cloud environment. The code can include multiple modules, each module running on a separate processor.

Aspects of the present invention are described by reference to flowcharts and/or block diagrams of procedures, devices (systems) and computer program products according to the embodiments of the invention. It should be noted that any block or part of the blocks of flowcharts, representations and/or block diagrams may be executed by computer program instructions, possibly in the form of a computer executable code. It is further noted that combinations of blocks in different flowcharts, representations and/or block diagrams may be combined if they are not mutually exclusive. These computer program instructions may be provided to a processor of a general purpose computer, special computer or other programmable data processing apparatus to produce a device such that the instructions executed by the processor of the computer or other programmable data processing apparatus produce means for executing the functions/steps defined in the block or blocks of flowcharts and/or block diagrams.

These computer program instructions may also be stored on a computer-readable medium which can control a computer or other programmable data processing devices or other devices to operate in a particular manner so that the instructions stored on the computer-readable medium produce a manufacturing product, including instructions which implement the function/step defined in the block or blocks of flowcharts and/or block diagrams.

The computer program instructions may also be stored on a computer, other programmable data processing devices, or other devices to cause execution of a series of process steps on the computer, other programmable data processing devices, or other devices to cause a process executed on a computer, so that the instructions executed on the computer or other programmable devices provide methods for implementing the functions/steps specified in the block or blocks of flowcharts and/or block diagrams.

LIST OF REFERENCE NUMBERS

100 Scanner
102 Display
104 Reading device
106 QR-Code
108 Processor
110 Interface
112 Memory
114 Instructions
116 Operation control computer
118 Network
120 Fire brigade database
122 Database
124 Fire alarm system
126 Processor
128 Interface
130 Memory
132 Instructions
134 Processor
136 Interface
140 Instructions
150 Technical system
200-208 Fire detectors
216-218 Doors

The invention claimed is:

1. A method for securing fire-hazardous operations to be executed by a person in a fire-hazardous spatial work area, wherein a unique area identifier is associated with the work area, wherein the area identifier in the work area is electronically readable, the method, performed by a device, comprising:
   receiving a unique identifier of the person,
   receiving an indication of the type of fire-hazardous operations to be executed,
   electronically reading the area identifier,
   sending a request to a database for master data on the work area, the request comprising the area identifier,
   receiving, in response to the sending of the request, the master data from the database, the master data comprising a unique spatial position of the work area,
   receiving a time period of execution of the fire-hazardous operations,
   interrogating safety devices of the work area to be deactivated for the duration of the time period, wherein the safety devices comprise fire detectors,
   sending a deactivation command to a fire alarm system, the deactivation command controlling the fire alarm system to exclude events reported by the safety devices to be deactivated for the time period for the immediate assessment of a fire alarm,
   sending safety data to a fire brigade database of a fire brigade responsible for the work area, the safety data comprising the type of fire-hazardous operations to be executed, the time period, the spatial position of the work area and the safety devices to be deactivated,
   authorizing, after the sending of the safety data, the execution of the fire-hazardous operations by the person for the time period.

2. Method of claim 1, further comprising executing the fire-hazardous operations by the person in the time period.

3. Method of claim 1, wherein the master data comprises further indications of any hazardous substances and/or machinery present in the work area during the time period which could endanger the person during the execution of the fire-hazardous operations.

4. Method of claim 1, further comprising by the device sequentially querying various safety measures to be carried out by the person before the execution of the fire-hazardous operations, the safety measures being capable of minimizing the risk of fire development or personal injury caused by the fire-hazardous operations.

5. Method of claim 4, wherein the authoring only comes into effect when all safety measures have been fully queried.

6. Method of claim 4, further comprising analysis of
the type of fire-hazardous operations to be executed, and/or
hazardous substances and/or machinery present in the work area during the time period,
the method further comprising automatic selection of the safety measures to be queried from a safety measures catalog based on the analysis.

7. Method of claim 6, wherein the analysis and/or the automatic selection is performed by an evaluation module, the method further comprising transmitting
the type of the fire-hazardous operations to be executed, and/or
hazardous substances and/or machinery present in the work area during the time period,
by said device via an air interface to said evaluation module for performing selection of said safety measures to be queried from said safety measures catalog based on said analysis, wherein in response to the transmitting said safety measures to be queried are received from said evaluation module.

8. Method of claim 4, further comprising
receiving from the person an entry of a confirmation of a set of queried safety measures, the confirmation indicating that the set of safety measures is to be executed,
verification whether the confirmed safety measures related to the further indications of hazardous substances and/or machinery present in the work area are sufficient to minimize the risk of fire development or personal injury from the operations in the work area, wherein the authoring only comes into effect when the verification shows that the confirmed safety measures are sufficient.

9. Method of claim 3, further comprising sending a control command to those technical systems from which there is a risk of fire development or personal injury caused by the executing of the fire-hazardous operations, wherein the control command controls the technical systems such that during the period the risk of fire development or personal injury caused by the executing of the fire-hazardous operations is minimized.

10. Method of claim 9, wherein the authoring only comes into effect when the technical system has acknowledged receipt and proper processing of the control command.

11. Method of claim 1, further comprising, the fire alarm system receiving, within the time period, a first event indication related to a possible fire from a fire detector positioned in an area adjacent to the work area into which any smoke may overflow from the work area, wherein the fire alarm system, based on the first event indication,
immediately triggers a fire alarm with a lower priority in comparison to a normal fire alarm; and/or
triggers a fire alarm with a lower priority in comparison to a normal fire alarm when a second event indication related to a possible fire has been received beforehand within the time period by a fire detector positioned in the work area; and/or
triggers a fire alarm with normal priority when no second event indication related to a possible fire has been received beforehand within the time period from a fire detector in the working area.

12. Method of claim 11, wherein in the event of the fire alarm with lower priority in relation to which the second event indication related to a possible fire was received beforehand within the time period from a fire detector positioned in the work area, an information related to the second event indication in conjunction with the indication of a possible correlation between these two events and the safety data are output on an operation control computer of the fire brigade responsible for the work area in addition to the information related to the first event indication.

13. A non-transitory computer-readable medium storing instructions, which when executed by one or more processors, cause one or more processors to perform the method of claim 1.

14. A device for securing fire-hazardous operations to be executed by a person in a fire-hazardous spatial work area, wherein a unique area identifier is associated with the work area, wherein the area identifier in the work area is electronically readable, wherein the device comprises a processor and a memory, wherein the memory comprises processor executable instructions, wherein the execution of the instructions by the processor causes the device to:
receive a unique identifier of the person,
receive an indication of the type of fire-hazardous operations to be executed,
electronically read the area identifier,
send a request to a database for master data on the work area, the request comprising the area identifier,
receive, in response to the sending of the request, the master data from the database, the master data comprising a unique spatial position of the work area,
receive a time period of execution of the fire-hazardous operations,
interrogate the safety devices of the work area to be deactivated for the duration of the time period, wherein the safety devices comprise fire detectors,
send a deactivation command to a fire alarm system, the deactivation command controlling the fire alarm system to exclude events reported by the safety devices to be deactivated for the time period for the immediate assessment of a fire alarm,
send safety data to a fire brigade database of a fire brigade responsible for the work area, the safety data comprising the type of fire-hazardous operations to be executed, the time period, the spatial position of the work area and the safety devices to be deactivated,
authorize, after the sending of the safety data, the execution of the fire-hazardous operations by the person for the time period.

15. System, comprising the device of claim 14 and a fire alarm system.

* * * * *